(12) United States Patent
Tomasic et al.

(10) Patent No.: US 8,566,699 B2
(45) Date of Patent: *Oct. 22, 2013

(54) INTENT-BASED INFORMATION PROCESSING AND UPDATES

(75) Inventors: Anthony Slavko Tomasic, Pittsburgh, PA (US); John Doyle Zimmerman, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 79 days.

This patent is subject to a terminal disclaimer.

(21) Appl. No.: 13/251,524

(22) Filed: Oct. 3, 2011

(65) Prior Publication Data

US 2012/0023393 A1    Jan. 26, 2012

Related U.S. Application Data

(63) Continuation of application No. 11/405,616, filed on Apr. 17, 2006, now Pat. No. 8,032,823.

(60) Provisional application No. 60/671,566, filed on Apr. 15, 2005.

(51) Int. Cl.
    *G06F 17/00*    (2006.01)

(52) U.S. Cl.
    USPC ............................................ 715/226

(58) Field of Classification Search
    USPC ............... 715/224, 225, 226, 256; 706/927
    See application file for complete search history.

(56) References Cited

U.S. PATENT DOCUMENTS

| | | | | | |
|---|---|---|---|---|---|
| 4,325,120 | A | * | 4/1982 | Colley et al. | 711/202 |
| 5,832,455 | A | * | 11/1998 | Hayashi et al. | 705/7.15 |
| 5,878,411 | A | * | 3/1999 | Burroughs et al. | 717/106 |
| 6,996,778 | B2 | * | 2/2006 | Rajarajan et al. | 715/734 |
| 2003/0222898 | A1 | * | 12/2003 | Macomber et al. | 345/709 |

* cited by examiner

*Primary Examiner* — Laurie Ries
(74) *Attorney, Agent, or Firm* — K&L Gates LLP

(57) ABSTRACT

In various embodiments, a method for processing a user request is provided. The method may include receiving input data from a user including at least natural language associated with a user request; analyzing the user input data with an intermediary agent; selecting at least one form based on analyzing the user input data; and, executing at least one update based on at least one form.

24 Claims, 23 Drawing Sheets

REQUEST

ADD: EMPLOYEE

HI SALLY

I'D BE HAPPY TO ADD THE EMPLOYEE "KAREN MALONE".

PLEASE TAKE A LOOK AT THE DETAILS BELOW AND MAKE ANY CORRECTIONS; THEN CLICK ON THE UPDATE BUTTON TO PROCEED.

-WEBMASTER ASSISTANT
WEBASSIST@CS.CMU.EDU

ADD: EMPLOYEE | CHANGE FORM... ▼

NAME: KAREN MALONE
ROOM:
PHONE: 6022 6022 281

EMAIL: KMALONE@ARDRA.COM
POSITION TYPE: [▼]
PROJECT: VEHICLE STABILITY [▼]

RESET    UPDATE

MY TASKS

I WILL ADD THIS INFO FOR KAREN MALONE TO THE FOLLOWING PAGE:

PAGE TITLE: [ORIGINAL PAGE]    [GENERATE PREVIEW]

UPDATE

*FIG. 4B*

| # | Task | Fields |
|---|---|---|
| 1 | Add: 2nd phone | name, phone |
| 2 | Delete: employee | name |
| 3 | Modify: employee name | old name, new name |
| 4 | Add: employee | name, email, room number, phone number |
| 5 | Delete: event | month, day, title |
| 6 | Modify: sponsor name | old sponsor, new sponsor |
| 7 | Delete: 2nd phone | name |
| 8 | Modify: email | old email, new email |
| 9 | Add: event | month, day, title, location |

FIG. 5

REQUEST

Modify: Employee

Hi Katie

This appears to be a request to modify an employee's name.

Please verify the data below; then click on the Update button and the web site will be updated immediately.

RADAR web master assistant v0.2
webassist@cs.cmu.edu

MODIFY EMPLOYEE  [Change Form ... ▼] ← 706

Old Name: [Walt Evenson]
New Name: [Walter Evenson] ← 704

[Reset] [Update]

UPDATES

Walt Evenson will change to Walter Evenson on the following page:

Page title: Vehicle Stability People
[Original Page] [Generate Preview] ← 708

[Update]

REQUEST

Modify: Employee

Hi Katie

This appears to be a request to modify an employee's name.

Please verify the data below; then click on the Update button and the web site will be updated immediately.

RADAR web master assistant v0.2
webassist@cs.cmu.edu

| MODIFY EMPLOYEE | Change Form... ▼ |
|---|---|
| Old Name: | Walt Evenson |
| New Name: | Walter Evenson |

[Reset]  [Update] ← 902

UPDATES

Walt Evenson will change to Walter Evenson on the following page:

Page title: Vehicle Stability People
[Original Page] [Generate Preview]     [Update]

FIG. 9

```
┌─────────────────────────────────────────────────────┐
│ ✉ SUBJECT: ADDITION TO AWARDS COMMITTEE WEBPAGE    │
│     FROM: ASHUK WENDORF <WENDORF@ARDRA.ORG>         │
│     DATE: 3/4/2005 1:29 PM                          │
│       TO: BLAKE RANDAL <BOR@CS.CMU.EDU>             │
├─────────────────────────────────────────────────────┤
│ ORIGINAL MESSAGE                                    │
├─────────────────────────────────────────────────────┤
│   FROM: ASHUK WENDORF <WENDORF@ARDRA.ORG>           │
│   SUBJECT: ADDITION TO AWARDS COMMITTEE WEBPAGE     │
│   DEAR BLAKE,                                       │
│   THANK YOU SO MUCH FOR HELPING ME OUT YESTERDAY.   │
│   THE ATTACHMENT IS A PHOTO OF MINE, AND THE        │
│   FOLLOWING INFO MIGHT BE USEFUL FOR THE AWARD      │
│   COMMITTEE WEBPAGE:                                │         ── 1208
│   JAMIE VILLANVEVA                                  │
│   CEO, TRANSPORTABLE.COM                            │
│   302-455-9400                                      │
│   EMAIL: VILLANVEVA@ARDRA.ORG                       │
│   THANKS AGAIN FOR YOUR ATTENTION, AND HAVE A       │
│   NICE WEEKEND!                                     │
│   CHEERS,                                           │
│   JAMIE                                             │
├─────────────────────────────────────────────────────┤
│ SELECT A FORM                                       │
├─────────────────────────────────────────────────────┤
│ WE THINK ONE OF THESE FORMS WILL LET YOU DO WHAT    │
│ YOU WANT. SELECT ONE TO CONTINUE.                   │
│  ┌────────────────────────────────────────────┐     │
│  │ MODIFY PERSON                              │     │
│  │ MODIFY AN EXISTING RECORD IN THE PERSON    │     │
│  │ DATABASE.                                  │     │
│  │ DELETE PERSON                              │     │         ── 1302
│  │ DELETE AN EXISTING RECORD IN THE PERSON    │     │
│  │ DATABASE.                                  │     │
│  │ ADD PERSON                                 │     │
│  │ ADD A NEW RECORD IN THE PERSON DATABASE.   │     │
│  └────────────────────────────────────────────┘     │
└─────────────────────────────────────────────────────┘
```

*FIG. 13A*

Original Message

From: Ashuk Wendorf <wendorf@ardra.org>
Subject: Addition to awards committee webpage Dear Blake, Thank you so much for helping me out yesterday. The attachment is a photo of mine, and the following info might be useful for the Award Committee webpage:

Jamie Villanveva
CEO, Transportable.com
302-455-9400 email: villanveva@ardra.org

Thanks again for your attention, and have a nice weekend!

Cheers,

Jamie

— 1404

Modify a Person

Request Type: [Person ▽]

[Add] [Modify] [Delete]

Choose Person to Modify: [Jamie Villanveva ▽]
[Click to show details of chosen Person to Modify]

| | | |
|---|---|---|
| First Name: | Jamie | Jamie |
| Middle Name: | | |
| Last Name: | Villanveva | Villanveva |
| Title: | | CEO |
| Organization | | Transportable.com |
| Organization URL | | |
| Office Location | | |
| Office Phone | | 302-455-9400 |
| Fax Number | | |
| Email | | villanveva@ardra.com |
| Personal Web Page | | |
| Biography/Interests | | |

Photo    None    [JVPic.jpg ▽]

[Modify This Person] [Preview Changes]

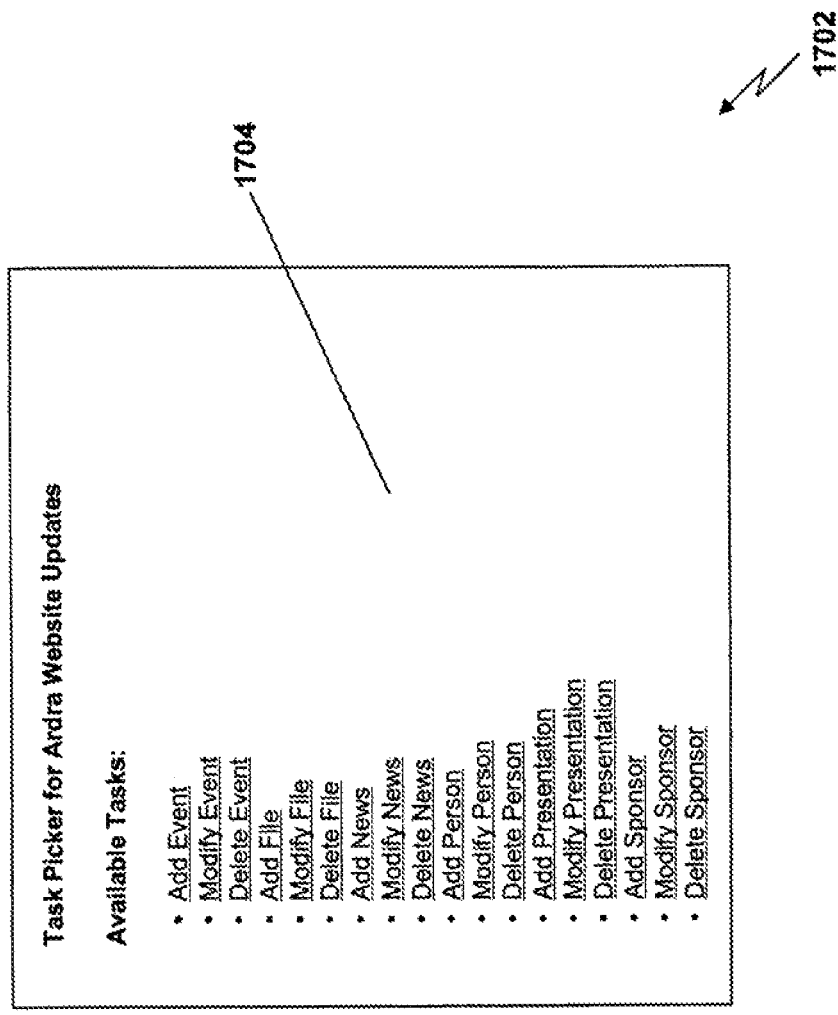

Modify a Person

Request Type: [Person ▼]

[Add] [Modify] [Delete]

Choose Person to Modify: [Jamie Villanveva ▼]
(Click to show details of chosen Person to Modify)

First Name: Jamie [Jamie]
Middle Name:
Last Name: Villanveva [Villanveva]
Title: [CEO]
Organization: [Transportable.com]
Organization URL:
Office Location:
Office Phone: [302-455-9400]
Fax Number:
Email: [villanveva@ardra.com]
Personal Web Page:
Biography/Interests:

Photo None [JVPic.jpg ▼]

[Modify This Person] [Preview Changes]

Google™   WEB   IMAGES   GROUPS   NEWS   FROOGLE   LOCAL   SCHOLAR   DESKTOP   MORE »

[FLY FROM PITTSBURGH TO LOS ANGELES DEPART MAY 1]   [SEARCH]   ADVANCED SEARCH
                                                                PREFERENCES

○ SEARCH THE WEB ⊙ SEARCH ENGLISH AND FRENCH AND GERMAN PAGES

WEB                                                          RESULTS 1 - 50 OF ABOUT 349

PITTSBURGH TO LOS ANGELES
WWW.KAYAK.COM   THE OFFICIAL TRAVEL SITE. 100+ AIRLINE SITES W/ONE SEARCH!

FLIGHTS FROM PITTSBURGH, PA TO LOS ANGELES, CA

✈  DEPARTING: [05/01]   RETURNING: [05/08] —2104
   SEARCH: EXPEDIA  HOTWIRE  ORBITZ  PRICELINE  TRAVELOCITY

CHEAP AIRLINE TICKETS TO PITTSBURGH, PA (ALL AIRPORTS) DEPARTING ...
OFFER UPDATED: 1 DAY AGO. FROM: LOS ANGELES, CA (LAX) TO - PITTSBURGH, PA (PIT).
DEPART: APR 19, 2006 RETURN: APR 26, 2006. OTHER DATES AVAILABLE ...
WWW.CHEAPFLIGHTS.COM/FLIGHTS/PITTSBURGH/LOS-ANGELES-INTL/ - 33K - CACHED - SIMILAR PAGES

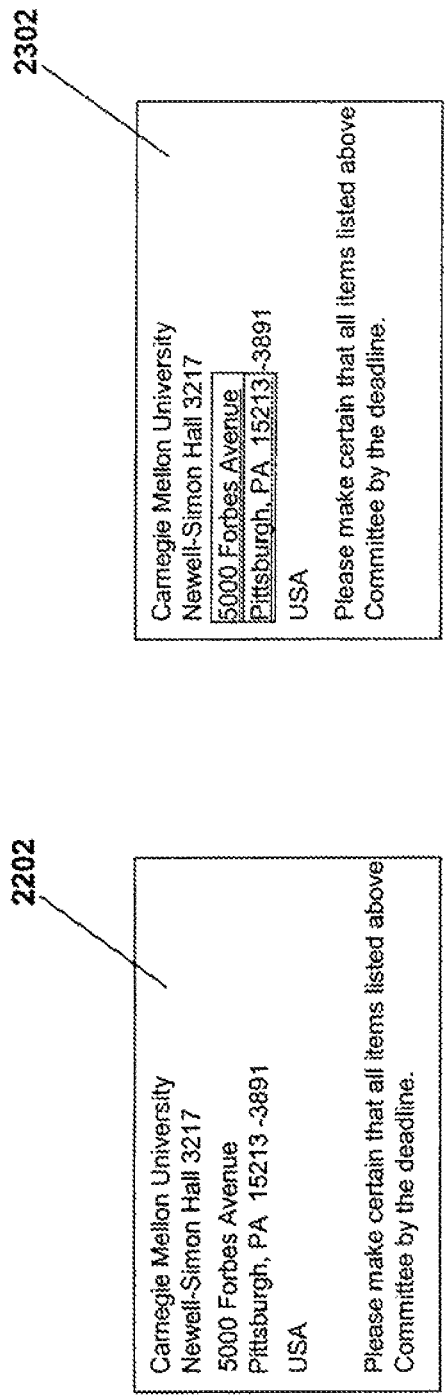

INTENT-BASED INFORMATION PROCESSING AND UPDATES

PRIORITY CLAIM/CROSS-REFERENCE TO RELATED APPLICATIONS

The present application is a continuation application of U.S. patent application Ser. No. 11/405,616, filed on Apr. 17, 2006, which claims the priority benefit of U.S. Provisional Patent Application Ser. No. 60/671,566, filed on Apr. 15, 2005. All of the foregoing applications are hereby incorporated by reference in their entirety into the present application.

FEDERALLY SPONSORED RESEARCH

The invention was made with government support in association with DARPA Contract No. NBCHC030029. The United States government may have certain rights in this invention.

BACKGROUND

Organizations often devote tremendous resources to implement workflow systems that allow users to request, obtain and process information. Organizations typically use internal web sites with FAQs, printed documentation, and administrative support help desks to help employees keep information update and accomplish various workflow tasks. Users may update databases through workflow (for structured or semi-structured information), document editing (for unstructured information), or through direct manipulation (for complex objects).

Consider an employee who wants to modify the automatic deposits that are made to her pension plan. Because she makes this type of modification rarely, she most likely does not know the appropriate procedure or where to find the appropriate form. In an organization, the employee can take one of several actions: (i) search the intranet web site for a FAQ that describes the procedure and provides the URL of the form; (ii) call the human resources department for help; (iii) delegate the task to an assistant, if she has one; or (iv) ask another employee if he knows how to solve this task. Regardless of the action taken, considerable "hunt time" (time to find the correct form) will be spent by the employee or other personnel. To reduce effort on this kind of task, organizations often devote substantial resources to prepare print and web documentation and maintain support staff.

Next, consider a manager who issues a request to a webmaster support staff member to: "Add a new employee, John Doe, to the website". In the best case, the webmaster understands the request and has all the information needed to complete the task and notifies the manager of the result. More often, confusion, ambiguity, missing information, and mistakes abound that result in an e-mail "ping pong" involving clarification requests. For example, if every person on the website must be associated with a project, then the webmaster must seek additional information to address the manager's request. This results in additional employee time and corporate resources being spent to resolve the request.

In the foregoing scenarios, it can be seen that the hunt time of the employee to locate a resource to complete a task, as well as the human resources devoted to the execution of the task, are substantial. In addition, when a support person is involved in a request, the total time to complete a task increases, because support personnel typically are not readily available at all times to address requests.

In certain contexts, many companies monitor their internal work practices, looking for opportunities to transition problematic work—work practices that are still being developed—into procedural activities that can benefit from the productivity gains of automation. However, in doing so, companies often turn workers into "translator" service agents who convert their co-workers natural expressions of intent into the language and structures required by underlying information systems. Such translators may spend significant time performing mundane, repetitive, procedural tasks, typically in response to e-mail requests or other communications. Examples of procedural tasks include, without limitation, updates to web sites, new equipment purchases, reporting vacation days, registration of computers on networks, conference room reservations, new hires, and many others.

The problem of translation occurs mainly for tasks with the following three properties: (i) the requester has an intent that aligns with a procedural task, (ii) the requester knows who the service agent is that can process this request, and (iii) the requester performs the task infrequently. For example, consider the task of transferring a student from the waitlist at a university to a course roster. In this example, suppose the requester is a professor who has a clear intent that matches a procedural task. The professor knows that the service agent who can process this request is the department coordinator. The professor can express his intent via an e-mail to the service agent with the relevant information such as the student's name and the course identification number. While the professor may perform this task twice a year, it is infrequent enough that she has not inquired about learning how to make the update herself.

Companies may address the handling of this class of procedural tasks by assigning a service agent, such as the department coordinator mentioned above, to specialize in processing certain types of requests. Examples of service agents include, without limitation, administrative assistants, secretaries, webmasters, network administrators, purchasers, and other like personnel. While the update request is often infrequent for requesters, the work generally has high frequency for the service agents who by design of the company infrastructure support many other workers. In most cases service agents have many duties to perform, and these mundane, update tasks reduce time that can be devoted to tasks that require more creative thinking and problem solving.

Often when companies have procedural tasks that can be automated, solutions can be developed such as designing an invoicing system or a web site that allows users to register new computers on the network, for example. While this approach can be effective at improving productivity by eliminating the service agent, it may not be appropriate in all situations. A procedural task may have a low enough frequency that it would not be worth the expense to engineer a solution. In addition, workplace practices are generally dynamic. As a consequence of changes in the market, the law, customer needs, internal company policy, and in underlying information infrastructure, work practices evolve and engineered solutions often have a difficult time keeping pace with the changes. Examples of this breakdown are ubiquitous in the business world as evidenced by the number of printed forms augmented by workers with annotations and adhesive notes, for example, that address the mismatch between the current procedure and the form instrument.

In view of these issues and problems, what are needed are more effective and efficient processes and systems for facilitating and processing user requests to modify or update information.

BRIEF DESCRIPTION OF THE FIGURES

FIGS. 4A-4B include a sample screen display illustrating various operational aspects in accordance with embodiments of the invention;

FIG. 5 includes a tabulation illustrating examples of various tasks and corresponding extracted fields associated with the tasks;

FIGS. 6 through 11 include sample screen displays illustrating various operational aspects in accordance with embodiments of the invention;

FIGS. 13A through 18 include sample screen displays illustrating various operational aspects in accordance with embodiments of the invention; and, FIGS. 19 through 23 include sample HTML page excerpts illustrating various operational aspects in accordance with embodiments of the invention.

DESCRIPTION

Figure 1:
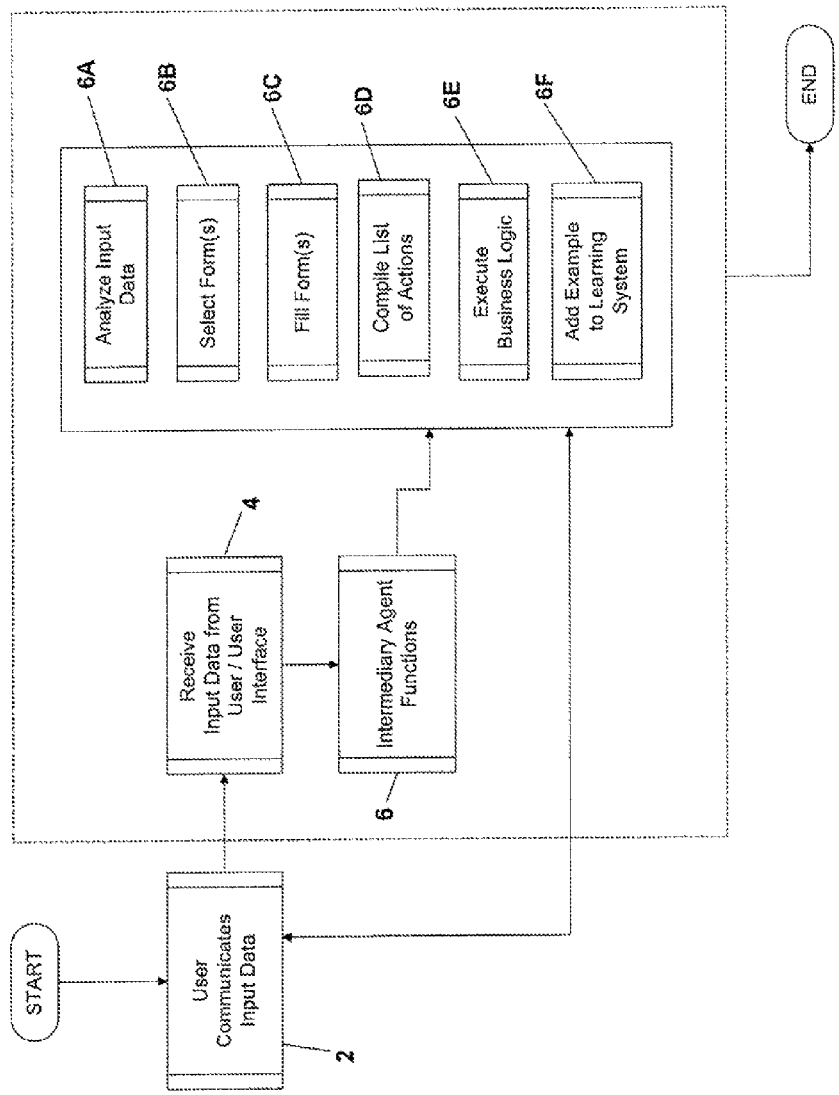
FIG. 1 includes a process flow diagram illustrating various examples of operational aspects of the invention.

As applied herein, the term "user" may include any entity or multiple entities capable of communicating input data to a device such as a computer system configured for processing text input. For example, a "user" may be a human user, a computer system or an interface between a human user and a device or system configured to receive input data, such as text input. One example of a "user interface" is a conventional speech-to-text conversion module capable of receiving verbal communication from a human user and converting the verbal communication into text input.

Where appropriate based on the context, operation and function of certain embodiments of the invention described herein, the term "requester" may be used interchangeably with the term "user" and vice versa.

The term "input data" may include free or unconstrained text input and/or constrained text input. It will be appreciated by those skilled in the art that constrained text input may be subject to one or more rules governing how input is to be entered by a user for communication to a particular device or system.

A "form" includes any collection of instances of control elements and/or input fields. A "control element" includes any user interaction control or user interaction widget. Examples of control elements include, without limitation, text boxes, radio buttons, sliders, check boxes, pull down menus, combo boxes, data input fields, and/or substantially similar functionality. Other examples of control elements include portlets and other aggregations of control elements having associated business logic.

The term "repair" involves user modification of instances of control elements and/or input fields included in a form or other data structure or any other manipulation to modify or supplement data represented by control elements or input fields.

The term "update" includes at least one modification of the state of one or more applications, repositories of information, documents, databases, and/or control elements. In certain aspects of the invention, an "update" does not include navigation or retrieval of data and/or updates may be performed or executed in accordance with predefined business logic. In certain embodiments, additional user or service agent interaction may occur in connection with execution of the "update".

An "intermediary agent" is any entity that performs analysis and other processing of input data. Examples of "intermediary agents" include, without limitation, computer systems, human agents, service agents, webmaster assistants, and/or any reasonable combination thereof.

A "target entity for update" includes any entity capable of being updated including, for example and without limitation, a record, a database record, a web site, a date, a time, a category, a color, a person, an attendee of a meeting, a stock price or value, and/or a variety of other kinds of entities that can be updated in accordance with embodiments of the invention.

A "wild label" includes evidence gathered by observation of user interaction with a form.

A "domesticated label" includes any machine-learning positive or negative label for a category (e.g., a category from a set of "k" possible categories), a sequence (e.g., a substring of a string), or an identifier (e.g., primary key of a database relation) extracted by observation of user interaction with a form.

A "gold label" includes any label generated from a traditional curation process that involves human judgment (generally used in supervised machine learning).

A "domestication algorithm" takes wild labels, optionally one or more gold labels, and machine learning examples as input and generates domesticated labels on the examples as output.

Figure 2:
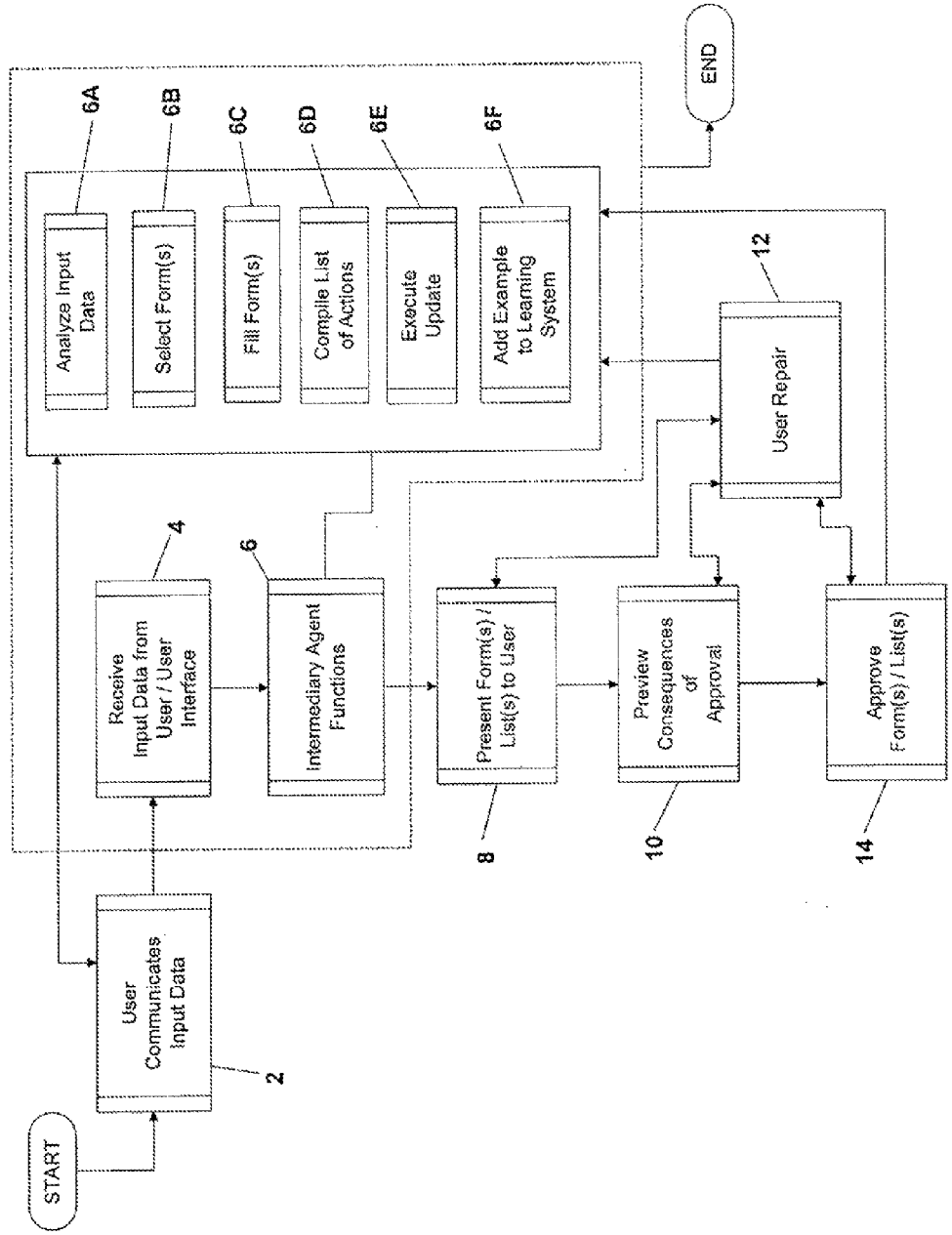
FIG. 2 includes a process flow diagram illustrating various examples of operational aspects of the invention.
Figure 3:
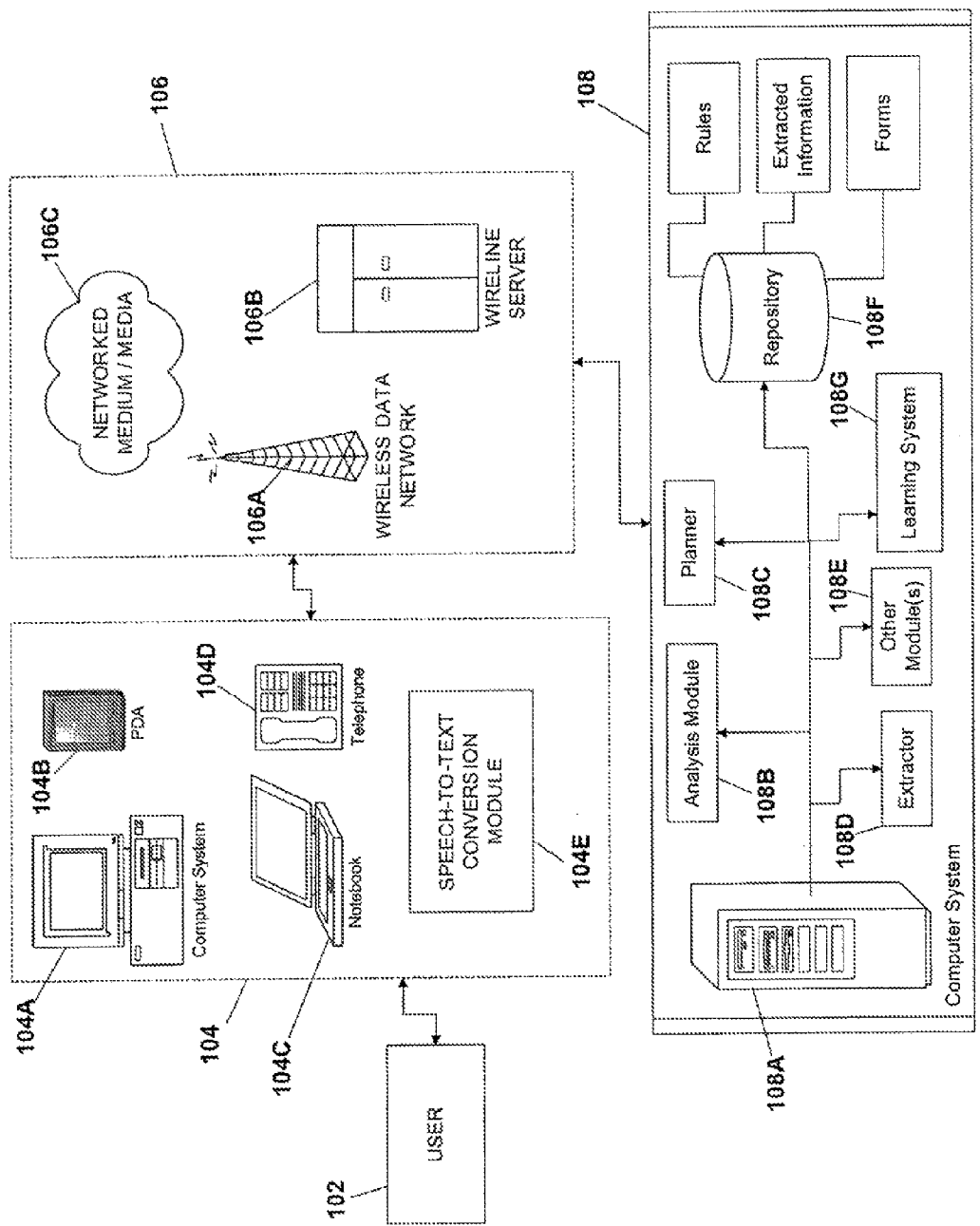
FIG. 3 includes a schematic system diagram in accordance with various embodiments of the invention.

Referring now to FIGS. 1 through 3, exemplary process and system embodiments of the invention are provided. At step 2, as shown, a user 102 communicates input data through a communication medium or media 106 to an intermediary agent 108. The input data may be supplied by the user 102 in natural language or free text form, for example, or may be in a constrained text format, such as if the intermediary agent 108 has been trained to recognize a certain format or syntax for the input data. In various embodiments of the invention, the input data supplied by the user 102 includes a request that can be addressed by a function to be performed by the intermediary agent 108. The input data may include one or more of the following kinds of communications, for example and without limitation: an e-mail, an instant message (IM), a pager message, a message recorded on a phone, a web page, a hyperlink, a short message service (SMS) message, a document, a publishing syndication field, a blog, a speech-to-text generated message, and/or any other form of communication.

Communication of the input data by the user 102 may occur through a variety of user interfaces 104 including, for example and without limitation, a computer system 104A, a personal data assistant (PDA) 104B, a notebook 104C; a wireless or wireline variety of telephone 104D, and/or a speech-to-text conversion module 104E. It can be appreciated that any user interface 104 capable of providing suitable input data from the user 102 to the intermediary agent 108 may be employed within the scope of the invention. In addition, the input data may be communicated from the user interface 104 to the intermediary agent 108 through an appropriate communication medium or media 106 such as, without limitation, a wireless data network 106A, a wireline server 106B, and/or through a networked media or medium 106C, such as by an Internet or intranet connection.

The intermediary agent 108 includes various components or modules that receive and/or store the input data in step 4. In general, the intermediary agent 108 is configured to perform one or more functions with the input data in step 6 including, for example, analyzing the input data (step 6A); selecting a form or forms responsive to the user 102 request represented by the input data (step 6B); filling the form or forms with information responsive to the input data (step 6C); compiling a list of actions to be performed as one or more updates in accordance with the user 102 request (step 6D); executing one or more updates based on receiving the input data and/or an approval from the user 102 (step 6E); and/or adding an example (step 6F) to a learning system 108G that may be operatively associated with the intermediary agent 108. In various embodiments of the invention, adding an example may be based on receiving the input data and/or a subsequent approval from the user 102.

In the embodiment of the invention shown in FIG. 2, the intermediary agent 108 may include a computer system 108A such as a conventional server, for example, configured for receiving input data from a user 102 or user interface 104 through one or more of the communication media 106. The intermediary agent 108 may also include an analysis module 108B, a planner module 108C, an extractor module 108D, and/or one or more other modules 108E that analyze the input data to select and fill an appropriate form, for example, responsive to the user 102 request, among other functions. In general, the modules 108B, 108C, 108D, 108E function cooperatively within the agent 108 to analyze, store and/or process input data received from the user 102.

The intermediary agent 108 may also include a repository 108F or other appropriate data storage medium for storing, among other things: rules that the agent 108 employs to analyze the input data; information extracted from forms or the input data; and/or one or more forms that have been assembled for selection by the agent 108 to respond to requests received from the user 102. As noted above, the intermediary agent 108 may also include a learning system 108G that employs examples derived from historical performance of the agent 108 with regard to processing user 102 requests, such as historical form selection performance, for example. The intermediary agent 108 may also be configured to execute or process updates (e.g., database updates) in accordance with receiving the input data or other communications.

It can be appreciated from the foregoing description of FIGS. 1 and 2 that various embodiments of the present invention may be performed without interaction between the user 102 and the agent 108 beyond the user 102 supplying input data to the agent 108.

Referring now to FIGS. 2 and 3, in step 8, based on the analysis performed by the intermediary agent 108, at least one form or list responsive to the input data may be presented for viewing by the user 102. The forms presented at step 8 may be derived from the function of the agent 108 in step 6B in selecting one or more forms. In certain embodiments of the invention, the agent 108 may present a list of actions or a task list in step 8 that the agent 108 proposes to undertake in response to the input data received from the user 102.

Multiple forms may be presented to the user in step 8. Such multiple forms may be prioritized in a list, for example, presented to the user 102 based on assessment and selection by the intermediary agent 108 of the form that most closely correspond to the user 102 request, the next best form that corresponds to the user 102 request, and so on. Prioritization of multiple forms may be accomplished by applying a statistical confidence rating to each form and then ranking the forms for presentation to the user 102 in order from highest confidence to lowest confidence.

In step 10, the user 102 may elect to preview the consequences of approving a form to determine what data or other information will be changed or updated once the form is approved and changes are implemented through updates executed by the agent 108. The user 102 may repair information in the presented form in step 12 to modify or supplement the information. The form can then be previewed again in step 10, the intermediary agent 108 may select another form to present to the user 102 based on the repair activity, or the user 102 may elect to approve the form in step 14. Once the form is approved in step 14, a communication is sent to the intermediary agent 108 to execute one or more updates (such as in step 6E) in accordance with the information or data contained in the approved form. In certain embodiments, updates performed or executed in step 6E may include at least one database update.

In certain aspects of the invention, the intermediary agent 108 may add an example to the learning system 108G in step 6F based on information or data associated with repair, approval of a form, and/or other actions. For example, if the user 102 repairs the form in step 12, this act of repairing may provide the basis for adding an example to the learning system 108G to "teach" the learning system 108G and enhance future performance of the intermediary agent 108 in processing user 102 requests.

The intermediary agent 108 of the invention may be embodied as a website maintenance agent that (i) allows users 102 to express the updates they want to make in human terms (e.g., free text input expression of intent), (ii) reduces the hunt time spent looking for the correct form for a task, (iii) reduces the manual execution time a user 102 would take to execute a workflow manually, and (iv) allows users 102 to quickly repair any inference errors the agent 108 makes. The inventors have discovered that interacting with a webmaster agent 108, for example, even one that may make inference errors, is both more efficient (faster) and more effective (reduced number of errors) than sending a request to a human webmaster. For example, suppose the user 102 e-mails the following request to the agent 108: "Change John Doe's home phone number to 800-555-1212". The webmaster agent 108 then replies with the biographical data form displaying information about John Doe with the new phone number already entered. The user 102 then simply approves the change.

The inventors have developed methods and systems that use an "information intent" strategy, in contrast to merely performing information retrieval. A simple form of information retrieval ("IR") might involve simply indexing all forms in a statically constructed forms-based data entry system and then giving the user search engine access to the forms. However, this approach does not work. Consider the simple intent, "Change John Doe's phone number to 555-1212". No search engine can match this query with the human resources form that changes contact information, because the indexed form does not contain any of the words in the example. One could attempt to augment the representation of the form with all the instances of the form so that the match succeeds (and it is questionable that this method would work well for a variety of intent). However, the user's intent is still not satisfied because the IR system would simply deliver the form without completing the form, since this requires a two-step workflow wherein the user 102 first finds the correct John Doe record (usually through a search interface) and then accesses the human resources contact information edit form. In contrast, embodiments of the present invention effectively construct and implement workflows on a dynamic basis.

The agent 108 can be configured to accept a natural language input description of the intent of the user 102, analyze its contents with the analysis module 108B using semantic parsing, generate a representation of the intent, and then pass this information to the planner 108C. The planner 108C assembles a workflow that implements the intent by combining microforms into a dynamic form that is presented to the user 102 for approval. Each microform corresponds to an atomic step of the workflow that executes a piece of the user's 102 intent. The meaning of the workflow is presented to the user 102 as a structured form. The user 102 inspects the workflow and corrects or repairs (e.g., see step 12) reasoning errors made by the agent 108. This repair step may involve another call to the planner 108C and the construction of a new workflow. The user 102 may also preview the effects of the workflow (see step 10) to understand its meaning more clearly. Finally, the user 102 may approve the workflow (see step 14) for execution of one or more updates (see step 6E). Since business logic can be implemented as microforms, users 102 are effectively executing complex workflow on the underlying database or other data structures when they approve a workflow (e.g., see step 14) that has been assembled by the planner 108C from microforms.

The approach used by the present invention offers many advantages: (i) users 102 can state their intent in free text instead of attempting to execute the workflow by hand, such as by navigation through a collection of static forms; (ii) describing a workflow with a form clarifies the meaning of the workflow for the user 102 in a natural way without resorting to, for example, displaying workflow scripts; (iii) a form interface makes identification and repair of agent 108 errors relatively fast, easy and natural for the user 102, (iv) since the system may be implemented using machine learning algorithms (e.g., learning system 108G), the agent 108 has the ability to automatically improve its performance based on an analysis of the corrections or repair provided by the user 102, (v) since the natural language analysis may be a separate component from the planner 108C that assembles the workflow, the agent 108 can be retargeted to different backend execution systems, e.g., web services, and (vi) the agent 108 can be made available at any time, thus providing a form of automatic on-line help desk support for workflows.

Various embodiments of the invention demonstrate a form of interaction design wherein user 102 correction of agent 108 inferences for free text input is handled by using interaction with a form (or forms) that may already be part of the user 102 experience. In addition, enhanced natural language analysis is provided by applying information extraction technology to accomplish a form of semantic parsing. Typically, every natural language system has as its core a lexicon, a grammar, and semantic rules. In general, the implementation lexicon is composed of dictionaries, a log of past user 102 input data, and database strings. The grammar is composed of a set of text extraction models (one model per field per microform). The semantic rules consist of a classifier and the business logic attached to the microforms. This form of natural language analysis offers the advantage of having no explicit grammar. This advantage means that improving performance of the analysis reduces to improving the performance of information extraction. This can lead to enhanced training data for the learning system 108G that can be automatically extracted by observing user 102 interaction with the agent 108.

In certain embodiments, as noted above, the invention may implement microforms. Microforms can be provided as forms specifically designed to satisfy particular information intent. For example, in a standard (macro) form system, a form that updates personal information may contain form fields for changing business address, business phone, home phone, cell phone, home address, and the like. For example, given the information intent, "Change John Doe's home phone number to 800 555 1212", a user of a (macro) form must deal with all of this information and hunt for the correct change. In contrast, the microform of the present invention is a reduced version of the standard form containing: (a) the lookup of the person associated with the update, and (b) the field to change the home phone number, but not other form fields. In addition, the user 102 may be given a way to access the standard form in the event the agent 108 makes a mistake in determining the person or field to modify.

In one example, the user 102 initiates the information intent process by sending an email request with input data which gets routed to the analysis module 108B of the agent 108. The analysis module 108B may generate a semantic representation of the user 102 request and pass the representation to the planner 108C component. The planner 108C augments the semantic representation by comparing the analysis with the current database state. The planner 108C then chooses a workflow template and instantiates that template by assembling a form from microforms based on the user 102 intent. The planner 108C instantiates the workflow with the specifics of the user 102 request and passes the result back to the user as a form, such as the form 402 illustrated in FIGS. 4A-4B. The user 102 can review the form 402 and add any additional information (thus modifying the workflow) or repair inference errors made by the agent 108 (thus modifying the instantiation of the workflow). If the planner 108C has chosen the wrong workflow template, the user 102 can override this choice by selecting a different workflow from a pull-down menu 404, for example, which returns or presents a new form pre-filled with extracted data. This step reinvokes the planner 108C so that it repeats its work on the newly selected workflow. When the form is complete, the user 102 can either preview the changes (see step 10) to the web site or approve the change (see step 14), causing the agent 108 to update the database (see step 6E). The results of this user 102 interaction may also be forwarded to a learning module such as the learning system 108G. The learning system 108G may analyze the entire interaction and improve performance of the modules 108B, 108C, 108D, 108E by providing additional training examples.

In certain embodiments, the present invention may employ one or more extractor modules 108D. For example, a learning algorithm may use a Conditional Random Fields extractor model. For extractions, tokens are any sequence of digits, any sequence of alphabetic characters or any single punctuation symbol. Depending on the field, a different set of features may be employed. For example, for learning names, the following can be used: four dictionaries (first names and last names from a white-pages dictionary containing a general list of names and first names and last names from names already in the database), the character type pattern of every current token, plus the patterns of the two tokens to the left and the two tokens to the right of the current token. The character type pattern comprises collapsed sequences of upper and lower case. For example, "Jane" collapses to "x+", "John" collapses to "X+x+", "McDonald" collapses to "X+x+X+x+" and "412" collapses to "9+". For learning phone numbers, the character pattern for the current token plus the character pattern for 4 tokens to the left and right can be used. The character pattern includes length, so "Jane" collapses to "xxxx", "John" collapses to "Xxxx", "McDonald" collapses to "XxXxxxxx" and "412" collapses to "999". Once a model is learned, it can be employed by the agent 108. When a new request including input data is received, it is passed to each model. The model accepts as input the string and returns as output the list of substrings recognized by the model.

Depending on the target field, the set of substrings are either interpreted as an old and new value ("Please change John Doe's room from 1111 to 2222.") or as a list of values ("The authors of the paper are John Doe and Sue Smith."). The tabulation of FIG. 5 includes various examples of fields that can be extracted based on various tasks that can be performed in association with embodiments of the agent 108 described herein.

The base workflow classification algorithm or workflow selection model (including, e.g., form selection) uses a k-way boosted decision tree classifier. Boosting is a method by which the performance of a base learner is improved by calling the base learner again and again on different variants of a dataset, in which examples are assigned different weights in each variant dataset: each new dataset is formed by weighting an example "e" more heavily if "e" was given an incorrect label in previous iterations. In certain embodiments, a "confidence-rated" variant of "AdaBoost" can be employed with a simple decision tree learner that does no pruning and which may be limited to binary trees of depth at most five. The decision tree learner uses as a splitting metric the formula suggested by Schapire and Singer as an optimization criteria for weak learners, i.e., splitting on a predicate P(x) which minimizes the function—+W W2, where W+(respectively W−) is the fraction of examples x for which the predicate P(x) is true (respectively false). This classifier is converted into a k-way classifier by choosing the class with the highest Posterior probability. The input to the k-way classifier is the set of names of the extractors (i.e., metadata): all extractors that returned at least one value and the classes determined by the classifiers, and additional atoms indicating a successful probe into the database. For each extracted attribute value, a database can be probed to determine if that value occurs in the appropriate attribute. Probes help the classifier recognize cases where a user 102 references an attribute's actual value. These "probes" into the database may use exact matching; or, alternatively, soft matching may be employed. In addition, a set of classifiers can be used for every attribute to detect cases where specific values are not referenced. For example, "Delete the phone number of John Doe" refers to the phone number attribute without providing a numerical phone number. One part of the analysis may be dependent on ad-hoc code. This part consists of matching entity identifiers based on the attributes involved. For example, an event may be referenced by the title, by the speaker, by the date, time and location, and the like. This ad-hoc code can be readily replaced with a general algorithm. In other embodiments, workflow selection may be performed by first classifying the input data to select a workflow, and then running workflow specific extraction.

Both extraction and workflow selection can improve when the user 102 corrects or repairs a form. In the event that the user 102 changes from one workflow to another, this action generates a label for the input data given by the user 102. The pair of the input and label are added as an additional training example to the set of existing workflow selection examples. The workflow selection learning algorithm is then invoked to improve the learned model. Consider the case where a user changes a form field to contain a new value V. To generate the training label for V from the input I, the agent 108 slides a window of length |V| across I, computing the Levenstein edit distance between the window and V. The closest match window can then be selected and labeled. This algorithm may assume, in certain situations, that the user 102 input data is correct and that the user has not changed the intended answer To implement microforms, a description of the required and optional attributes is associated with each relation. Each field is also linked to the extractor for that field. In certain embodiments of the invention, required attributes are always part of a workflow. Optional attributes appear for insertion, modification or deletion of associated values, and the pre-filled value is extracted. Required and optional attributes appear when an entire entity is inserted.

The planner 108C may use a backend model that consists of attribute & set of values pairs that result from extraction (that is, any extractor associated with an microform field may generate a set of extracted values from the input), classifiers that recognize references to attributes, a classifier that selects the correct workflow, and microforms with associated business logic to execute the workflow.

Figure 6:
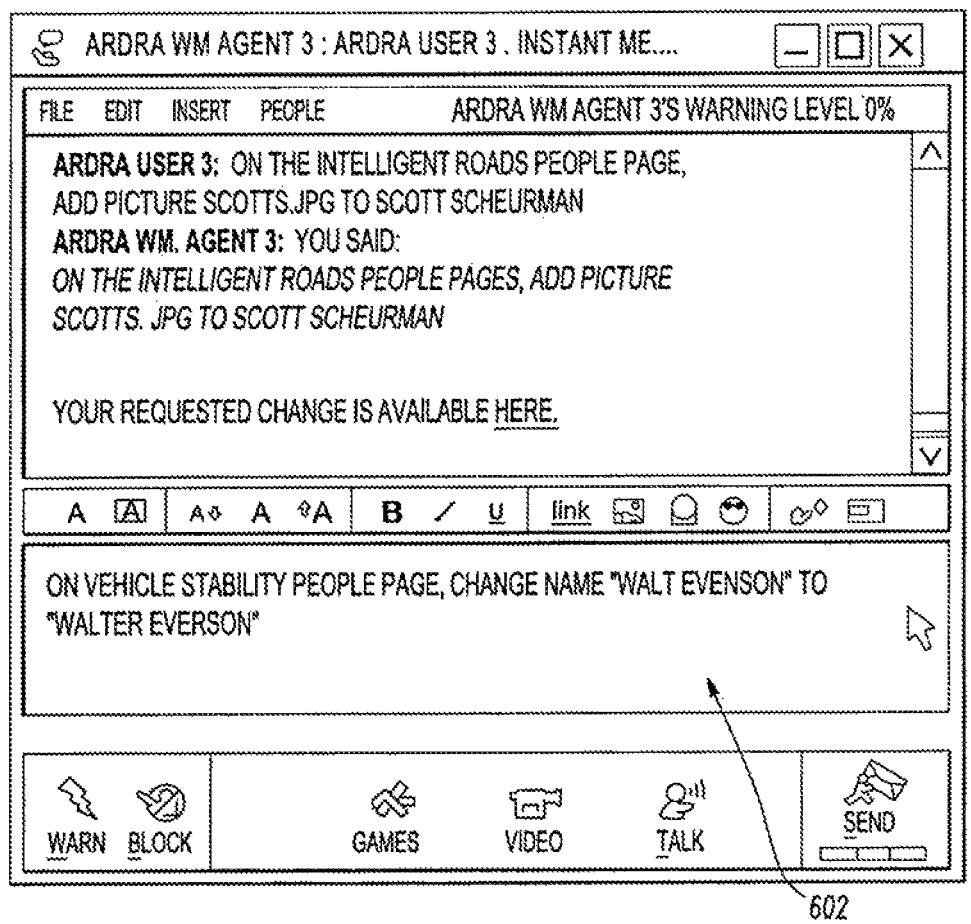
Figure 8:
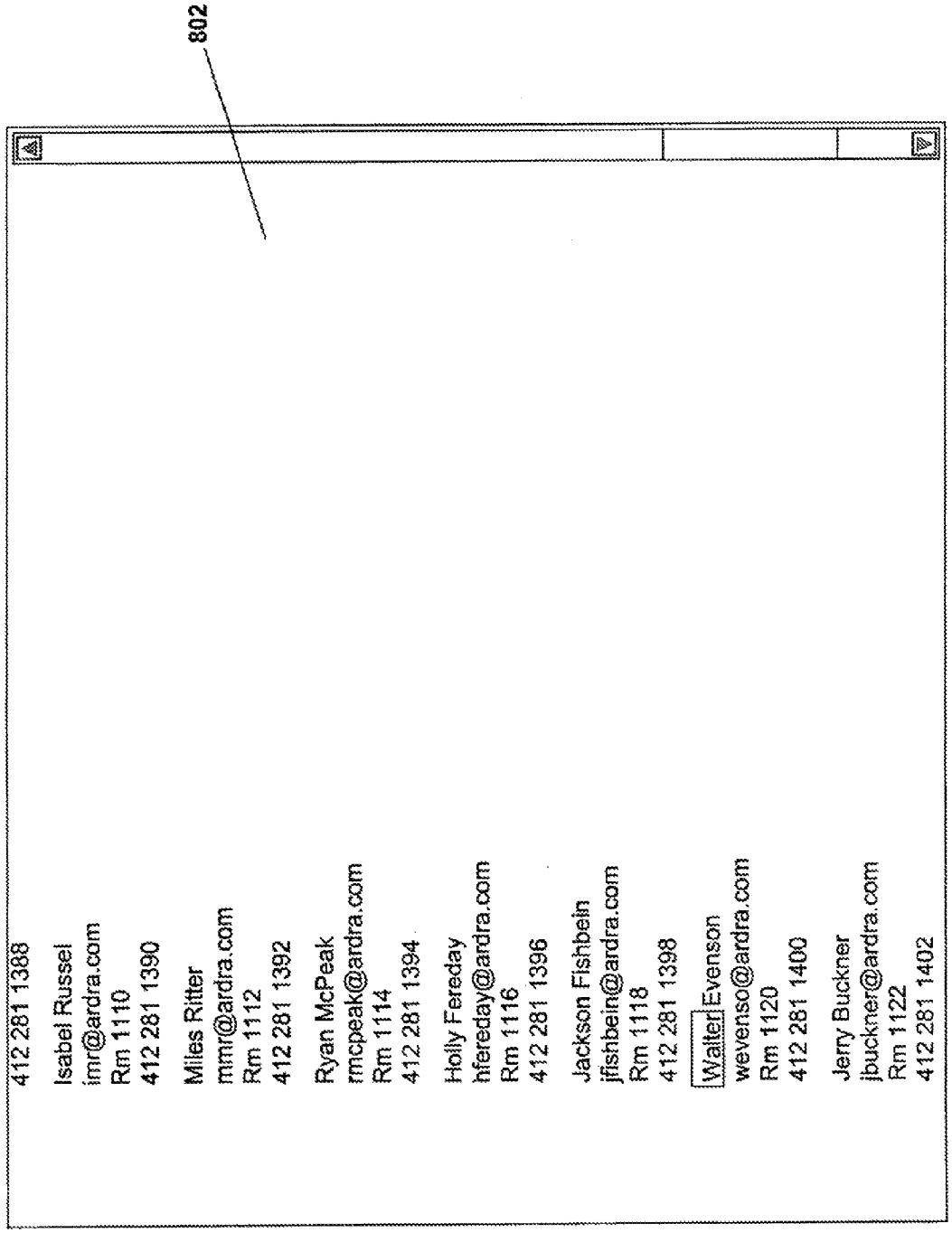
Figure 10:
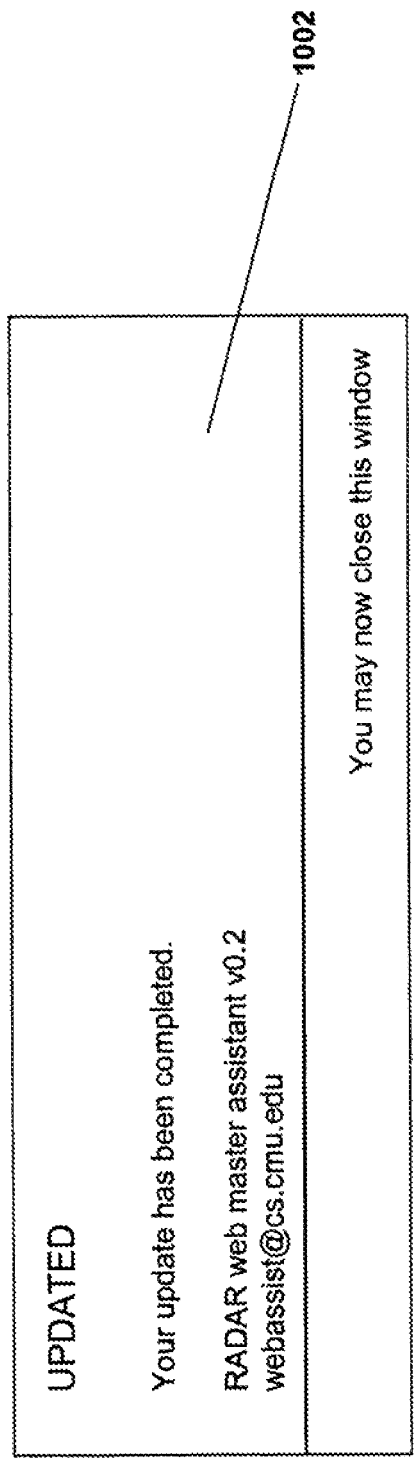

The following is a walkthrough of an example interaction with the agent 108. As shown in FIG. 6, the interaction begins when the user 102 sends the agent 108 a request including input data 602: "on Vehicle Stability People page, change name 'Walt Evenson' to 'Walter Evenson'". The analysis module 108B of the agent 108 executes a library of information extraction modules on the request and extracts data for the employee. These extractions are looked up in the database or the repository 108F to determine if they already exist. All of this information, plus the original request, is given to a classifier that selects the "Modify: Employee" workflow. As shown in FIG. 7, the agent 108 replies with a graphical user interface 702 containing the best-guess workflow or form selection filled with the results of the analysis performed by the agent 108. This workflow may be constructed based on the microforms that compose it. Note that the planner module 108C has correctly chosen the workflow and correctly identified the name change to "Walter Evenson" in field 704 based on the user 102 request. If the agent 108 had selected the wrong form or workflow, the user 102 could override this selection by using the pull-down menu 706 labeled "Change Form", for example. Changing to a new workflow would invoke the planner 108C of the agent 108 to construct a new workflow instance. In addition, before approving this change, the user 102 can follow the "Generate Preview" link 708 at the bottom of the interface 702 to view the web page or pages that will be modified and to preview what the page will look like once the update has been made. The preview 802 of the change is shown in FIG. 8. As shown in FIG. 9, once the user 102 is satisfied with the changes to be made, an "Update" button 902 can be selected to direct the agent 108 to make the name change effective. Subsequent confirmation 1002 of this update is shown in FIG. 10.

It can be seen that the interface 702 of FIG. 7 may be representative of a microform that only displays the fields related to the request of the user 102. Instead of showing an entire biographical information form found in most human resources databases, for example, the microform only reveals the minimum of information needed for this transaction and thus reduces the amount of navigation time to verify an update.

In certain embodiments of the present invention, the agent 108 may present a form to the user 102 with an input field or other control element in a blank, unactivated or otherwise uninstantiated state. For example, this may be an input field that the agent 108 could not populate with text based solely on the input data derived from the user 102 request. This can be considered a "soft fail" in that the uninstantiated control element serves to alert the user 102 that data entry or other manipulation is required to instantiate the control element.

Figure 11:
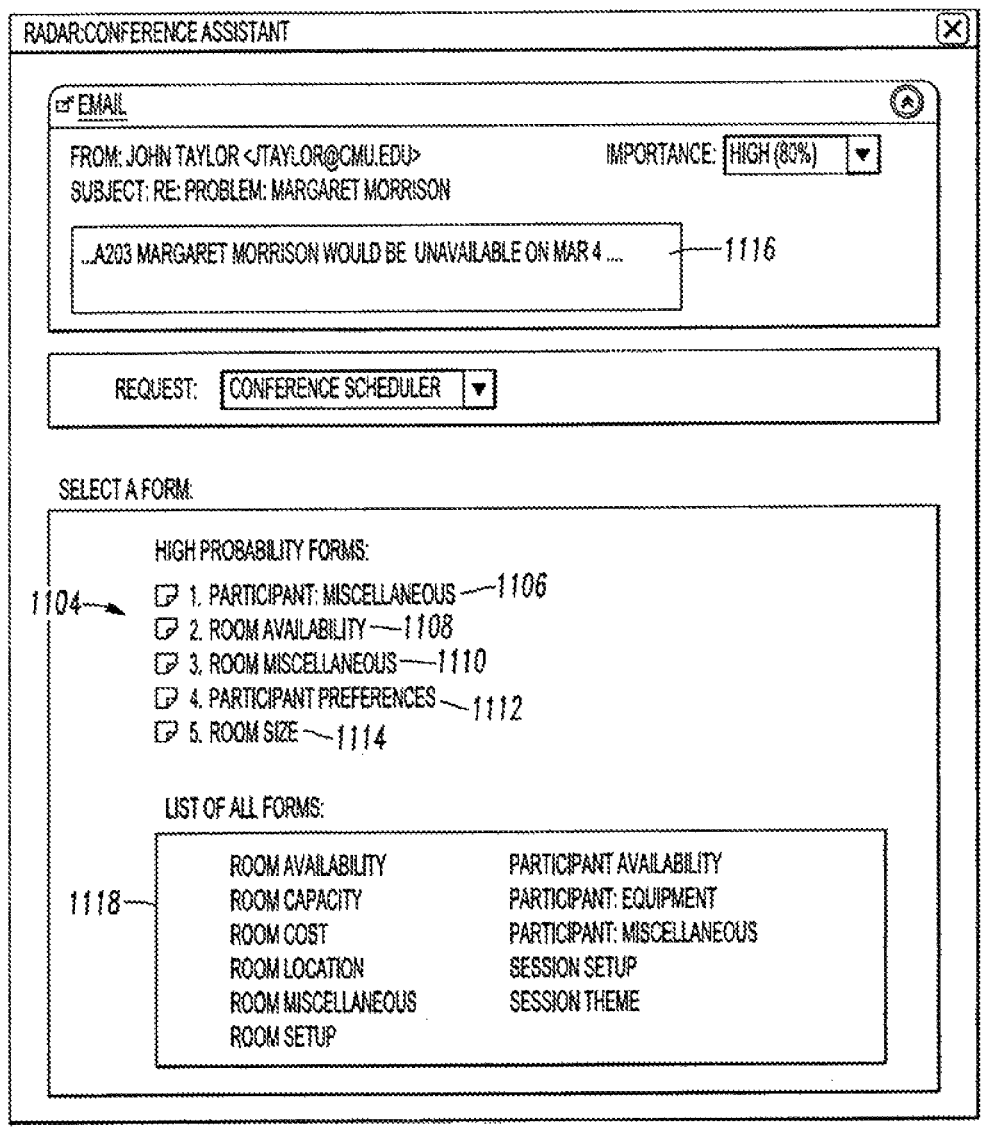

With reference to FIG. 11, a screen display 1102 is illustrated which includes a list 1104 of different forms 1106, 1108, 1110, 1112, 1114 that potentially may address the user's 102 request (which is shown in field 1116). As discussed above with respect to step 6B, the list 1104 may be organized based on a statistical confidence rating of each form to determine the order in which the list 1104 is presented on the screen display 1102. In deciding on the order of presentation, the agent 108 determines the form most likely to address the user's 102 request 1116, i.e., the "Participant: Miscellaneous" form 1106; the form next most likely to address the request 1116, i.e., the "Room Availability" form 1108; and so on with the other forms' 1110, 1112, 1114 in the list 1104. In addition, a section of the screen display 1102 may include a complete listing 1118 of all forms from which the user 102 may select a correct or desired form.

In another example of the present invention, consider a user 102 that intends to make a presentation at a meeting. With a properly built information intent system, the user can simply instruct the agent 108 to "begin the presentation for this meeting" or an equivalently communicated request. The agent 108 looks up the current meeting, determines the correct presentation, invokes the correct tool to begin the presentation, turns off e-mail and instant messenger notifications, turns off automatic hibernate mode, and turns on the external video port. This example demonstrates that embodiments of the agent 108 employ an information intent strategy with broad implications for practice of the invention.

Additional examples of the application of embodiments of the invention are summarized in the following scenarios:

Scenario #1
Tom, a manager, wants to increase the hourly rate for one of his employees.
Tom sends a message to Sally, his assistant: "Please increase Kelvin's pay to $36 per hour."
Agent intercepts and processes message.
Agent selects salary increase approval form and fills it in with the employee name and the new salary information.
Sally receives the form from the agent. She compares it with the original email and approves the message.
Agent submits completed form to update the payroll database.

Scenario #2
John, a scientist, wants to begin a lecture in his class.
John sends a message to his agent: "Setup my machine for today's lecture."
Agent intercepts and processes message.
Agent selects a form containing the file name for today's lecture, and a list of check boxes including: (i) turn on external video port, (ii) turn on monitor mirroring, (iii) open file forbear, (iv) turn off power saver, (v) change IM status to unavailable, and (vi) turn off screen saver.
John receives the form from the agent.
John inspects the form and approves all actions.
Agent prepares machine for lecture.

Scenario #3
Anthony, an accountant, is updating a spreadsheet.
Anthony sends a message to his agent: "Make the background color of all cells where money is summed blue."
Agent intercepts and processes message.
Agent selects a form and fills in with extracted data.
Anthony receives form showing his request, including a link to preview change.
Anthony selects the preview and inspects the effect of this change.
Anthony approves update.
Agent makes update to the spreadsheet.

Scenario #4
Timmy calls his agent from his mobile phone and asks it in natural language to reserve a conference room for tomorrow at 10:00 am.
The agent converts the speech to text.
The agent processes the message.
Timmy receives a forth on the screen of his phone detailing his request and with room 1021 listed as the assigned conference room.
Timmy inspects the form and approves the reservation.
Agent updates the conference room reservation database.

Scenario #5
Abby decides she would like to schedule a meeting with Paul and John. She creates an outgoing message and types in the meeting request: "Paul and John, let's meet at 3 pm tomorrow in my office". She sends the message.
The agent intercepts the message, analyzes its contents, determines that it is a meeting request, and extracts the time, date, location and participants of the meeting.
The agent presents a calendar to Abby with the proposed meeting in place.
Sally approves the proposed meeting.
The message is sent to Paul and John with an attachment describing the meeting.

Information intent also touches upon research in Computer Support for Cooperative Work ("CSCW"). In applying the agent 108 of the present invention to the CSCW case, several choices are available based on the routing of messages. In the single user 102 scenario, for example, the information intent message, the clarification dialog, and the final approved form may all be done by the same user 102. In comparison, in the case of a busy executive, for example, the clarification dialog can be handled by an office assistant and then forwarded to a webmaster, assuming the office assistant has access to the additional information needed to complete a request. Or, the executive can execute the clarification dialog herself and forward the final approval workflow to a webmaster or service agent. In each of these situations, the benefit and costs of using the agent 108 may be shifted between various users in an organization for more effective and efficient workflow.

The invention may also provide a form of user interface interaction design wherein an information intent request generates a microform as an answer to the request. The use of information intent allows for generation of a microform that focuses precisely on the needs of a particular command. The presentation of a microform also facilitates rapid correction of agent 108 errors. Experimental results have shown, for example, that one user 102 interacting with the agent 108 can complete tasks significantly faster than two users 102 working together with conventional information processing methods and tools. It can be seen that enhanced performance can be derived from a reduction in ambiguity in the dialog, in the speed with which the agent 108 analyzes the request, and even though the agent 108 may make selection errors, the speed with which the user 102 is able to correct any such agent 108 errors.

Furthermore, in various embodiments, the framework described herein can be applied to more flexible workflow systems. The backend target can be transaction workflows, but just as easily can be a sequence of web services calls, or some other formal language for combining queries and updates.

In various embodiments of the invention, computer agents can be provided that can learn and begin to automate what are typically considered mundane, procedural update tasks usually performed by a service agent. One objective of the invention is to use computers to focus on repetitive work tasks that the computers execute well, and to provide more time for human service agents to focus on comparatively larger and more difficult tasks that require creative problem solving and which may be more interesting for them.

In various embodiments, the invention provides processes and systems that combine natural language interaction with existing direct manipulation tools and a feedback loop to the machine-learning algorithms used by the agent 108. The invention strikes a balance between automation and direct manipulation by using an automated agent to understand the task the user has been assigned and by using direct manipulation controls to allow users to repair agent errors and approve transactions. The invention integrates theories from mixed initiative computing and natural language research, advances the effectiveness of human-agent interfaces by addressing the real issues of agent error and measuring performance, and provides applications that offer enhanced support for task execution and project management.

Figure 12:
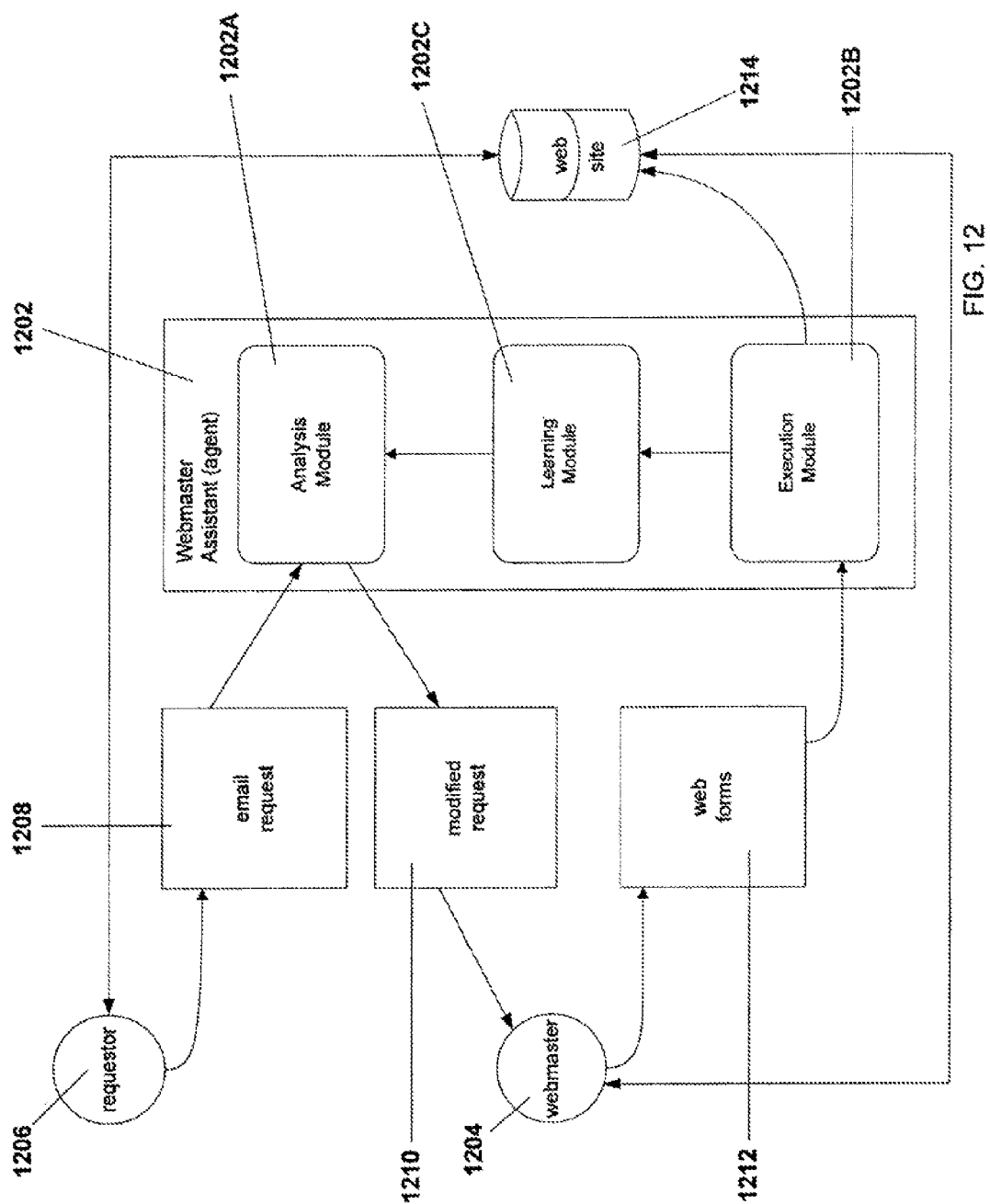
FIG. 12 includes a combined system architecture/process flow schematic in accordance with various embodiments of the invention.

Embodiments of the invention allow users or requesters to use natural language to communicate intent, such as by an e-mail communication, for example. Presentation of the request in terms of a form allows users to manage task performance degradation by permitting repair of agent errors. In various embodiments, the system advances or evolves by using a machine-learning approach to facilitate improvement over the operational life cycle of the agent 108. In addition, various user interfaces enable free text input for website update requests and allow users to address what happens when the agent 108 misinterprets a request. With reference to FIG. 12, an example of a process and system architecture including a machine learning computer agent or service agent assistant 1202 is shown. In various embodiments, the assistant 1202 can assume the role of assisting to a service agent 1204 or a human service agent, for example. One or more requesters 1206 may communicate their intents (e.g., updates for a website) through a request 1208 to the service agent assistant 1202 using natural language in an e-mail message, for example. In various embodiments, the request 1208 may include, for example and without limitation, an e-mail, an instant message (IM), a pager message, a message recorded on a phone, a web page, a hyperlink, a short message service (SMS) message, a document, a publishing syndication field, a blog, a speech-to-text generated message, and/or any other form of communication that can be processed by the agent 1202.

The agent 1202 can preprocess the incoming requests 1208 and present them to the service agent 1204 as one or more completed update forms as part of a modified request 1210. The modified request 1210 may provide traditional direct manipulation tools that allow the service agent 1204 to recognize the tasks the requester 1206 wishes to complete; repair mistakes made by the assistant 1202; add additional information; and/or, approve the requests 1208 for further processing. In various embodiments, these repairs and approvals provide additional training data to the agent 1202 that may automatically improve its performance. The choice of a service agent's assistant 1202 is merely representational and illustrative of a variety of different kinds of computer agents that may be employed within the scope of the invention. It can be seen that various embodiments of the invention reflect a process and system design intended to generalize to the set of update tasks that may be found within companies or other organizations.

Figures 13B, 19:

With reference to FIGS. 12 through 14, the requester 1206 can initiate a transaction or task by communicating the request 1208 for routing to an analysis module 1202A of the agent 1202. The agent 1202 may modify the communicated request 1208, which may be an incoming e-mail, for example, or another type of communication, by adding a prioritized list 1302 of the most likely task it infers the requester 1206 wants, followed by a structured list 1304 of all available forms, as shown in the screen display of FIGS. 13A-13B. The service agent 1202 may then review the e-mail request 1208 as part of a modified request 1210, and then may select the link most closely matching the request 1208. The service agent 1304 may then interact with a task-form or web form 1212 that can display control elements available for update with as many elements as possible already completed or populated.

An example of a task-form 1402 that displays the original request 1404 and a form 1406 including control elements available for update with as many control elements as possible completed is illustrated in FIG. 14. FIG. 14 represents an example web form or task-form 1212 presented to the service agent 1204 upon selection of a link in the modified request 1210. As shown, the top of the form includes the e-mail request 1404. Having this information imbedded in the form 1402 helps the service agent 1204 confirm that the form 1402 represents the task to be completed and provides access to any text or other information the service agent 1304 may wish to cut and paste into the form 1406, for example. It can be appreciated that embedding the source e-mail 1404 in this manner helps communicate that a link has been created between the specific update and the e-mail that requested the change. Such linking can help to automate a logging system that tracks these relationships, for example, and provides additional traceability when investigating changes to the website, database or other data or information source that employs embodiments of the processes and systems described herein.

Figure 15:
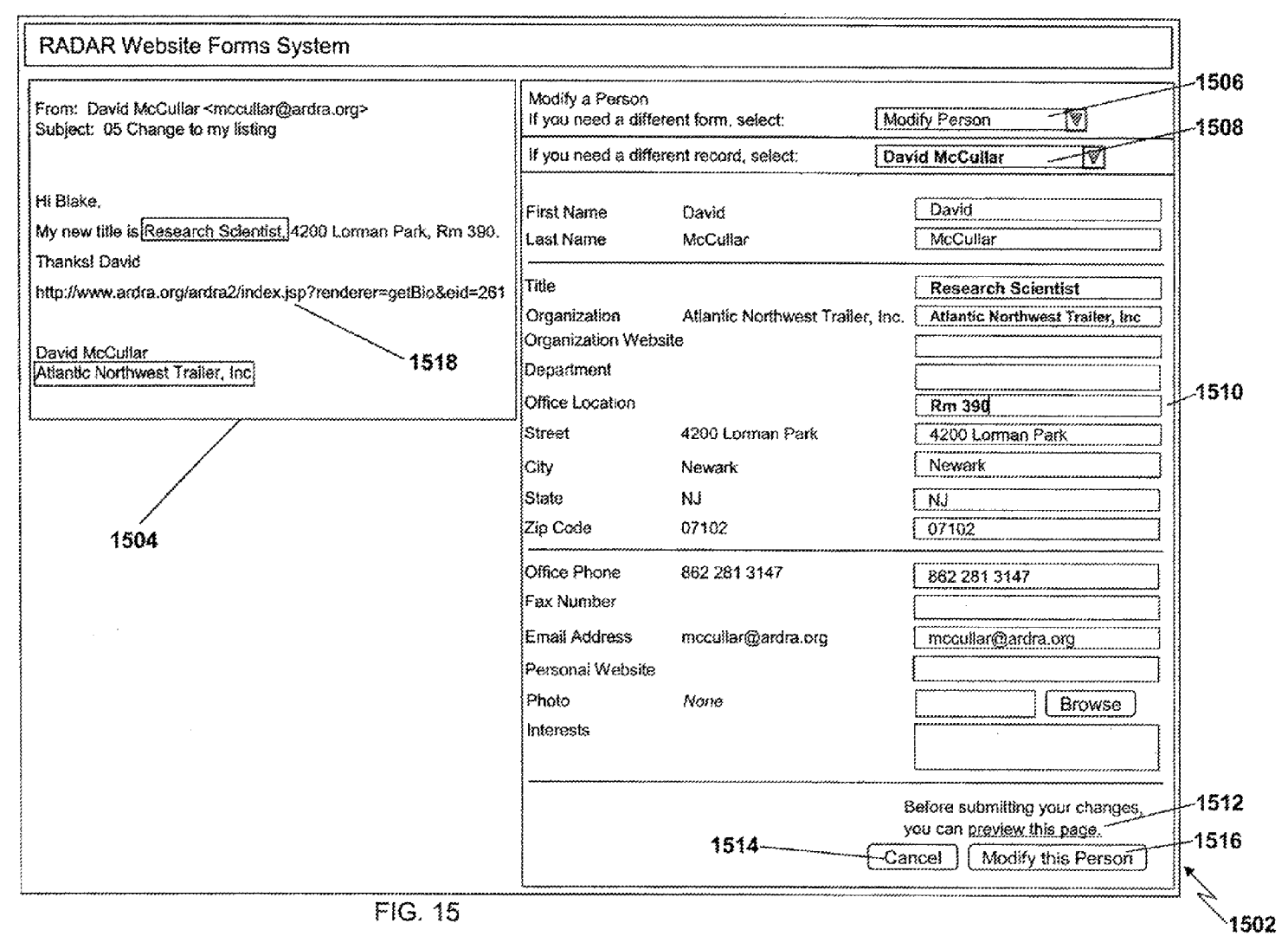

With reference to FIG. 15, another example of the task-form 1212 is illustrated. As shown, the task-form 1502 can include: a copy of the source e-mail 1504; a pull-down menu 1506 for selecting a different task-form, if desired; a pull-down menu 1508 for selecting a different database record, if desired; various form elements 1510 required for an individual form; a link 1512 that when clicked generates a preview of the updated web page; a cancel button 1514 that when clicked closes the task-form 1502 without performing any updates; and/or, an update button 1516 that when clicked completes the transaction and executes update to a database or the web site 1214. It can be seen that providing the source e-mail 1504 permits the service agent 1204 to copy and paste text, for example, between the e-mail 1504 and the form elements 1510. In certain embodiments, various elements in the task-form 1502, the request 1208, and/or the modified request 1210, may use an "action indicator" to help communicate what actions have been taken by the agent 1202 on or in association with the element. Examples of action indicators that may be applied include, for example and without limitation, background color, highlighting, underlining, font modification, a sound, and/or any other type of audible, visual, or audiovisual indicator. In certain embodiments, the action indicator may be presented as a tabulation of the actions taken and by whom. For example, elements 1510 that have been updated by the agent 1202 may have an orange background; elements 1510 that have been updated by the service agent 1204 may have a blue background; and elements 1510 that show no change may have a white background.

In addition, an action indicator or other augmentation may be employed in the e-mail 1504 to help the service agent 1204 or others see the items that have been extracted. By highlighting extracted text in the e-mail 1504, for example, the service agent 1204 can more easily see when errors have occurred. In certain embodiments, when the service agent 1204 selects a link 1518 in the e-mail 1504, the agent 1202 completes the selected form with the results of its analysis of the source e-mail 1504. The service agent 1204 can then switch to another form by navigating the pulldown menu 1506 between the e-mail 1504 and the website database form elements

1510. The agent 1202 can also be configured to populate the newly selected form with the results of its analysis of the e-mail 1504. The link 1512 offers the service agent 1504 the ability to preview the update without actually making a change to the website or other data source. This may help the service agent 1504 understand the consequences of submitting the update for execution by the execution module 1202B.

It can be seen that the service agent 1204 may add any missing information and/or repair any incorrectly completed information in the task-form 1212. The service agent 1204 may then elect to preview proposed updates and/or select update, thereby causing an execution module 1202B to update a website 1214 (as shown), a database, a repository, and/or another internal or external data source. The results, including the task-form 1212 the service agent 1204 selected from the modified request 1210 and any updates or repairs made, can then be forwarded to a learning module 1202C, which analyzes the entire transaction and improves or teaches the analysis module 1202A. It can be seen that embodiments of the invention implement a feedback loop that uses the transaction to improve the machine learning algorithms that form the basis of the analysis conducted by the agent 1202. Thus, the agent 1202 learns many variations in expression through repeated transactions and completion of various tasks.

Referring again to FIG. 12, in various embodiments, the agent 1202 may include multiple components for facilitating and/or processing requests 1208, such as the analysis module 1202A, the learning module 1202C, and the execution module 1202B. It can be seen that input to the analysis module 1202A can be an e-mail request 1208 or other communication, and the output to the service agent 1204 can be a set of form field suggestions and a rank ordering of suggested forms as part of the modified request 1210. The analysis module 1202A may perform various steps to generate suggestions to the service agent 1204. The analysis module 1202A may perform dictionary construction including a dictionary having the set of tokens that appear in the values for a given attribute of a given relation. The dictionary may include standard first name and last name dictionaries, for example. The analysis module 1202A may also perform extraction by using a machine-learning-based extractor model that can executed for every field or control element of various forms. The analysis module 1202A may also perform entity recognition: each relation may have a designated set of key attributes, and each value generated by an extractor for these attributes may be used to attempt to look up the associated instance of the relation. A matched instance can be used as the suggested value for an associated form. In addition, the analysis module 1202A may perform form selection with a machine-learning-based form classifier model that can be executed to rank forms with respect to the classifier's expectation that a form satisfies the request 1208.

In various embodiments, the results of the analysis module 1202A can be used to construct a modification to augment or enhance at least a portion of the user 102 input data, the request 1208, the modified request 1210, and/or the task-form 1212. Examples of "augmentations" applied herein with respect to various embodiments include, for example and without limitation, one or more of the following: an action indicator, a task list, a form, and/or a link. The results of form submission can be processed by the execution module 1202B, which may include a standard set of business logic that executes database transactions, for example. The transactions implement the meaning of the form. In addition, the form results can be provided as input to the learning module 1202C. In certain operational aspects, the learning module 1202C analyzes the form results and generates a set of training labels based on the e-mail message associated with the request 1208. The document and its labels can be added to the existing corpus of messages that can be used to train the extractors and form selection classifiers.

Figure 16:
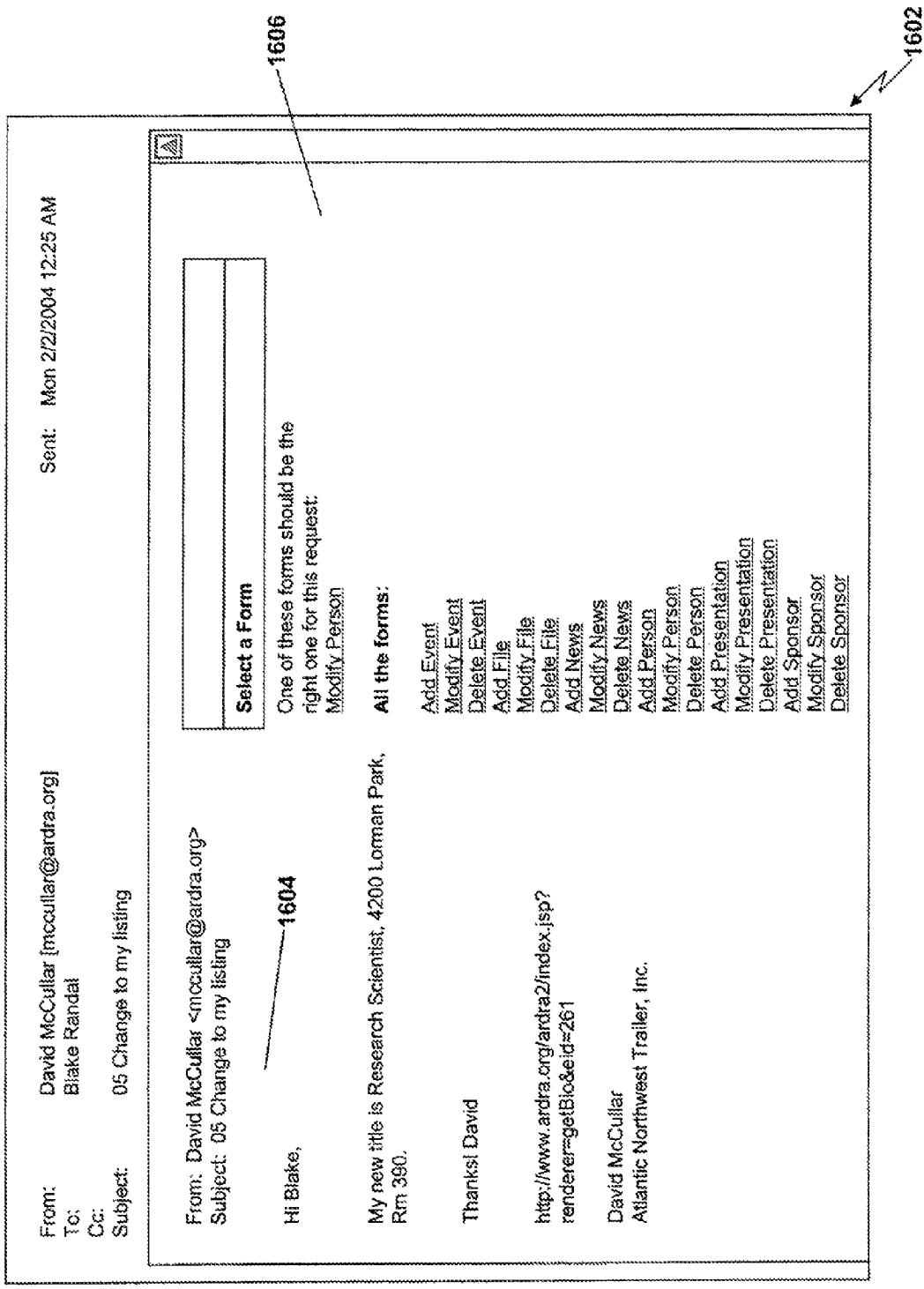

With reference to the screen display 1602 of FIG. 16, an example of the modified request 1210 illustrates an incoming email request 1604 the agent 1202 has modified with a prioritized and structured task list 1606, as shown. The modified request 1210 can facilitate understanding of the intent of the requester 1206 by using a threshold value to determine the length of the ranked list 1606. In various embodiments, when the agent 1202 has a relatively high statistical confidence in a single form, then only one such form may be displayed in the list 1606; when the agent 1202 has high confidence in more than one form, multiple forms may be displayed in the list 1606; and, when the agent 1202 has relatively low confidence for all forms, then the entire list 1606 of tasks may be displayed.

It can be appreciated that embodiments of the invention support "young" computer agents: agents with little or no training. The invention supports agents that transition from providing almost no support to agents that can perfectly process transactions. Service agents such as the service agent 1204 train the agent 1202 by simply performing their work, and over time the agent 1202 may begin to complete more work associated with transactions without errors or involvement by the service agent 1204. In addition, because the agent 1202 practices learning, it can adapt to changes in the work practice and requirements of service agents. In refining the design of the invention, the inventors addressed the issue of "young" agents that make errors that do not significantly decrease task performance. For a solution, the inventors looked to search results screens such as those used by conventional search engines (e.g., the trade-designated "Google" search engine), which provide users with a ranked list of alternatives. Users of such search services typically have little expectation that the top-ranked link will always be the one they want. This approach is a form of "soft fail" wherein an agent error nonetheless moves the user closer to the goal of completing a given transaction.

In various embodiments, the agent 1202 operates in a "catch" capacity, working as an assistant to the receiver or service agent 1204. The agent 1202 catches the incoming request 1208 and preprocesses it to make the job of the service agent 1204 easier. However, the design can also support a "push-back" approach, wherein a list of possible forms is returned to the requester 1206 as a reply to the request 1208. The requester 1206 can then be permitted to perform the update. In this capacity, the agent 1202 operates more like an intelligent information retrieval system that, given a description of the intent of the requester 1206, finds and automatically completes the relevant form. The interaction model with the modified e-mail and form can be substantially the same. In the "push-back" capacity, however, a function may be offered to the requester 1206 to forward the request 1208 directly to the service agent 1204. This option can be offered in the event that the task cannot be accomplished by the agent 1202. In deciding whether to implement the agent 1202 in catch or push-back mode, issues can be considered such as the importance of the time of the requester 1206, the domain knowledge needed to complete the task successfully, and/or any approvals or authorizations needed to complete an update, among other factors.

In various embodiments of the invention, a content management system (CMS) interface can be implemented that uses forms that reflect action similar to that of the agent 1202.

As shown in the example of FIG. 17, a screen display 1702 can be presented to a user to allow selection of a task from a structured list of tasks 1704. Selecting an item from the task list 1704 transitions the user to the selected form. The CMS form 1802 (as shown in the example of FIG. 18) may be substantially the same as other agent forms described above, except for the possible exclusion of the source e-mail, for example. The interaction model associated with the CMS form 1802 can be based on conventional service agent interface configurations used for updating databases or other information sources. In one operation example, the service agent 1204 can review each incoming request 1208, check for agent 1202 errors, perform repairs, and/or approve the updates. This CMS model of interaction may help the service agent 1204 feel more in control of the changes or updates that are executed, may provide better traceability between updates and the requests 1208, and may keep the service agent 1204 better informed of agent 1202 activity compared to a more fully automated system.

The following examples may be employed in association with various agent and/or service agent embodiments described herein.

Figure 20:

In a first example, a user composes and submits a message 1902 to a search engine system or agent, as shown in the exemplary HTML page excerpt of FIG. 19. The system analysis component or module analyzes the message, perhaps based on static code, or on code based on machine learning with gold labels, to perform one or more of the following steps: extraction of strings from the message 1902, classification of the message 1902 to a form, and/or named entity recognition. If the system computes a high confidence in its analysis, the system may perform a transaction automatically in association with a completed form (e.g., ordering airline tickets), or possibly with additional input from the user. Otherwise, the system may select an appropriate form and return the selected form in a pre-filled condition to the user, as shown in the exemplary HTML page 2002 of FIG. 20. The user may then review the pre-filled form, correct errors or add information, such as by adjusting the return date field 2104 as shown in the HTML excerpt 2102 of FIG. 21, and then submit the completed form to the system. The system then performs the transaction associated with form, perhaps with additional input from the user.

In another example, a user composes and submits a message 1902 to a search engine system or agent, as shown in the exemplary HTML page excerpt of FIG. 19. The system analysis component or module analyzes the message based on machine learning with domesticated labels, to perform one or more of the following steps: extraction of strings from the message 1902, classification of the message 1902 to a form, and/or named entity recognition. If the system computes a high confidence in its analysis, the system may perform a transaction automatically in association with a completed form (e.g., ordering airline tickets), or possibly with additional input from the user. Otherwise, the system may select an appropriate form and return the selected form in a pre-filled condition to the user, as shown in the exemplary HTML page 2002 of FIG. 20. The user may then review the pre-filled form, correct errors or add information, such as by adjusting the return date field 2104 as shown in the HTML excerpt 2102 of FIG. 21, and then submit the completed form to the system. In this example, the system may extract any corrections or otherwise learn from the user input and feed this information back to an analysis module of the system. The system then performs the transaction associated with form, perhaps with additional input from the user.

In another example, the user submits a message to the system, such as the message 2202 shown in FIG. 22. The system analysis component or module analyzes the message 2202 based on machine learning with domesticated labels, to perform one or more of the following steps: extraction of strings from the message 2202, classification of the message 2202 to a form, and/or named entity recognition. If the system computes a high confidence in its analysis, the system may perform a transaction automatically in association with a completed form (e.g., ordering airline tickets), or possibly with additional input from the user. Otherwise, the system may select an appropriate form and return the selected form in a pre-filled condition to the user, as shown in the exemplary HTML page 2302 of FIG. 23. The user may then review the pre-filled form, correct errors or add information; and then submit the completed form to the system. In this example, the system may extract any corrections or otherwise learn from the user input and feed this information back to an analysis module of the system. The system then performs the transaction associated with form, perhaps with additional input from the user. It can be seen, in this example, that the system may acquire the message 2202 to process the transaction either with or without user interaction.

Based on the foregoing description, it can be seen that embodiments of the invention provide processes and systems for an enhanced human-agent interaction design. This design can benefit users that (i) have an intent to make an update, (ii) know who can complete this update, and (iii) do not understand the type of task enough to do it themselves. The invention permits users to express tasks in terms of natural language. The aunt can analyze the request and then present a structured response to the user. The interaction design also provides various direct manipulation interfaces that allow the user to recognize, repair, and approve the request in a more efficient manner. In various user studies conducted by the inventors, based on a sample of requests sent to a human service agent, the system significantly improved the time performance of the service agent and the perception of useability, without significantly increasing the number of errors. The interaction design also reflects that the agents, with little training, can benefit specialists such as service agents or webmasters in the performance of mundane, procedural update tasks.

It can be appreciated that numerous combinations are possible of the various processes, systems, features, elements, processes, structures described above with respect to the intermediary agent, computer agent, and/or service agent embodiments described within the scope of the invention. For example, learning processes, systems, modules or functions may be applied, or not applied, to one or more intermediary agent, computer agent, or service agent embodiments described herein.

The term "computer-readable medium" is defined herein as understood by those skilled in the art. It can be appreciated, for example, that method steps described herein may be performed, in certain embodiments, using instructions stored on a computer-readable medium or media that direct a computer system to perform the method steps. A computer-readable medium can include, for example and without limitation, memory devices such as diskettes, compact discs of both read-only and writeable varieties, optical disk drives, and hard disk drives; memory storage that can be physical, virtual, permanent, temporary, semi-permanent and/or semi-temporary; and/or, one or more data signals transmitted on one or more carrier waves.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. No particular aspect of the examples is necessarily intended to limit the scope of the present invention.

It should be appreciated that all the figures are presented for illustrative purposes and not as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A method for processing a user request, the method comprising:
   electronically receiving input data in an electronic intermediary agent wherein the input data includes at least natural language associated with a user request, wherein the intermediary agent includes at least one electronic computer processor and at least one electronic non-transitory computer-readable medium;
   electronically analyzing the user input data with an analysis module of the intermediary agent;
   electronically selecting at least one form with the intermediary agent based on analyzing the user input data;
   electronically executing at least one update with the intermediary agent based on at least the selected form;
   electronically forwarding information regarding processing of the request to an electronic learning system operatively associated with the intermediary agent; and
   adding an example to the learning system, wherein the example is derived from performance of the intermediary agent with regard to processing the request.

2. The method of claim 1, further comprising filling the selected form with the intermediary agent with data responsive to the user request.

3. The method of claim 2, further comprising presenting at least one of the filled forms on a display.

4. The method of claim 3, further comprising receiving data indicative of approval by the user of at least one of the presented forms.

5. The method of claim 3, further comprising receiving data indicative of repair of at least a portion of at least one of the filled forms.

6. The method of claim 3, further comprising presenting a preview of consequences of approval of at least one of the filled forms.

7. The method of claim 1, wherein executing the update includes updating at least one target entity for update.

8. The method of claim 1, wherein selecting the form further includes selecting a plurality of forms.

9. The method of claim 8, further comprising prioritizing the plurality of forms.

10. The method of claim 1, wherein analyzing the user input data includes selecting at least one control element stored within a repository operatively associated with the intermediary agent.

11. The method of claim 10, further comprising filling at least one of the selected forms with data obtained from at least one of the selected control elements.

12. The method of claim 1, further comprising modifying at least a portion of the input data with at least one augmentation.

13. The method of claim 1, further comprising compiling one or more update consequences in association with analyzing the user input data.

14. The method of claim 1, further comprising compiling one or more updates in association with analyzing the user input data.

15. The method of claim 1, further comprising adding at least one example to the learning system in association with repair of a form.

16. The method of claim 1, wherein the input data includes at least one communication selected from the group consisting of an e-mail message, an instant message (IM), a pager message, a message recorded on a phone, a web page, a hyperlink, a short message service (SMS) message, a document, a publishing syndication field, a blog, and a speech-to-text generated message.

17. The method of claim 1, further comprising modifying the input data to include a representation of multiple available forms.

18. The method of claim 1, further comprising receiving data indicative of selection of a form matching the intent of the request.

19. The method of claim 1, further comprising presenting a form on a display.

20. The method of claim 19, wherein the presented form includes multiple control elements available for update with at least one control element completed.

21. The method of claim 19, wherein the presented form includes the input data and a form including multiple control elements available for update with at least one control element completed.

22. The method of claim 19, wherein the presented form includes at least a portion of the input data.

23. The method of claim 19, wherein at least a portion of the presented form includes an action indicator to communicate an action taken.

24. The method of claim 1, further comprising receiving data indicative of a selection of at least one target entity for update.

* * * * *